(12) United States Patent
Singh et al.

(10) Patent No.: US 11,556,236 B1
(45) Date of Patent: Jan. 17, 2023

(54) CONTEXTUAL SCROLLING

(71) Applicant: CITRIX SYSTEMS, INC., Fort Lauderdale, FL (US)

(72) Inventors: Manbinder Pal Singh, Coral Springs, FL (US); Mathew Varghese, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/449,034

(22) Filed: Sep. 27, 2021

(51) Int. Cl.
*G06F 3/04855* (2022.01)
(52) U.S. Cl.
CPC .................. *G06F 3/04855* (2013.01)
(58) Field of Classification Search
CPC .................................................. G06F 3/04855
See application file for complete search history.

(56) References Cited

U.S. PATENT DOCUMENTS

| | | | | |
|---|---|---|---|---|
| 11,354,350 | B2* | 6/2022 | Deng | G06F 3/0482 |
| 2002/0186251 | A1* | 12/2002 | Himmel | G06F 3/0485 |
| | | | | 715/784 |
| 2008/0024465 | A1* | 1/2008 | Hawkins | G06F 3/0482 |
| | | | | 345/184 |
| 2008/0034319 | A1* | 2/2008 | Hawkins | G06F 3/0362 |
| | | | | 715/784 |
| 2014/0013243 | A1* | 1/2014 | Flynn, III | G06F 3/0488 |
| | | | | 715/753 |
| 2015/0253943 | A1* | 9/2015 | Yu | G06F 3/04842 |
| | | | | 715/739 |
| 2015/0355833 | A1* | 12/2015 | Feltham | G06F 3/0483 |
| | | | | 715/784 |
| 2020/0326824 | A1* | 10/2020 | Alonso | G06F 3/0485 |
| 2021/0216699 | A1* | 7/2021 | Muthukesavaraj | G06F 3/0485 |

FOREIGN PATENT DOCUMENTS

WO    WO-2007017784 A2 *  2/2007  ........... G06F 3/0485

* cited by examiner

*Primary Examiner* — Asher D Kells

(57) ABSTRACT

A method, a system, and a computer program product for performing contextual scrolling. One or more first scrolling operations being performed in a first view of a user interface are detected. A content in the first view of the user interface associated with the one or more first scrolling operations is identified. One or more second scrolling operations for executing navigating between one or more of the first view of the user interface and at least another view of the user interface are selected based on the one or more first scrolling operations and the identified content. The selected second scrolling operations are executed.

19 Claims, 11 Drawing Sheets

CONTEXTUAL SCROLLING

BACKGROUND

A computer mouse is a hand-held pointing device that detects two-dimensional movement relative to a surface. This movement is typically translated into the motion of a pointer on a computer display and allows control of a computer graphical user interface. A computer mouse can have one or more buttons to allow use/selection of various items on a computer display. Other elements, e.g., touch surfaces, scroll wheels, etc. can also be part of some computer mice designs and can enable additional control, dimensional input, and other functions. However, while computer mice allow scrolling, it is important to provide contextual scrolling within user interfaces, which can improve user's productivity.

SUMMARY

In some implementations, the current subject matter relates to a computer implemented method for performing contextual scrolling. The method may include detecting one or more first scrolling operations being performed in a first view of a user interface, identifying a content in the first view of the user interface associated with the one or more first scrolling operations, selecting, based on the one or more first scrolling operations and the identified content, one or more second scrolling operations for executing navigating between one or more of the first view of the user interface and at least another view of the user interface, and executing the selected one or more second scrolling operations.

In some implementations, the current subject matter can include one or more of the following optional features. The first and second operations may be scrolling operations associated with one or more operations of the computer mouse, a computer keyboard, a touch screen, a smartphone, a tablet computer, a laptop, a personal computer, a personal digital assistant, an audio device, a speech-to-text computing device, a speech recognition computing device, a virtual computing device, an augmented reality computing device, and/or any other device. In some implementations, the current subject matter system may identify a first location of at least one of: a graphical pointer (e.g., of the computer mouse, etc.) and a scroll bar in the user interface. The system may then determine a second location of at least one of: the graphical pointer and the scroll bar, and scroll, using the executed selected second operations, to the identified first location (e.g., a scroll back functionality).

In some implementations, the current subject matter system may detect a plurality of first operations being performed within a predetermined period of time. The system may then select a second operation to correspond to the plurality of first operations (e.g., a rapid scroll operation).

In some implementations, the first view may include a first element of the user interface. The system may then select one or more second operations to navigate to a second element of the user interface. The second element may be located in at least one of the first view and at least another view. This may be similar to intelligent content based and/or page wise scrolling functionalities.

In some implementations, one or more first operations may include one or more scrolling operations executed in a first direction. One or more second operations may include one or more scrolling operations executed in a second direction. The first and second directions may be different upon system selection of the second operations. This may be similar to the ability to switch directions of scrolling.

In some implementations, at least one of the first and second scrolling operations may include at least one of the following: a scrolling operation in a horizontal direction, a scrolling operation in a vertical direction, a scrolling operation in a diagonal direction, a scrolling operation in one or more directions, and any combination thereof.

In some implementations, selection of the second scrolling operations may include selecting one or more second scrolling operations based on an interval between one or more first scrolling operations. Further, selection of the second scrolling operations may include selecting a scrolling direction of one or more second scrolling operations based on a detected scrolling direction of one or more first scrolling operations.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the deficiencies of currently available solutions, one or more implementations of the current subject matter provide for an ability to provide an ability to perform contextual scrolling through user interfaces (e.g., documents, web pages, text, images, graphics, videos, etc.) using a computer mouse.

In some example implementations, the current subject matter may be configured to provide an ability to perform a contextual scrolling on a user interface (e.g., within a document, a web page, an image, graphics, a video, etc.) using any computer mouse. Alternatively, or in addition to, contextual scrolling may be executed on and/or using any device, such as, for example, a touch screen, a smartphone, a tablet computer, a laptop, a personal computer, a personal digital assistant, an audio device, a speech-to-text/speech-recognition computing device (for example, a user providing audio instructions (which may be converted to computing commands) to advance and/or scroll from one portion of a user interface (e.g., an image) to another portion of the user interface (e.g., another image), as discussed herein), a virtual/augmented reality computing device (e.g., user may use hand gestures to indicate user's intention to scroll, as discussed herein), and/or any other device. The contextual scrolling may be performed with and/or without use of a computer mouse (e.g., using a finger, a stylus pen, etc.). For ease of illustration only, the following discussion will be presented with regard to performing contextual scrolling using a computer mouse, however, as can be understood, the concepts discussed herein are applicable to any computing device, including, but not limited to those listed above. Such contextual scrolling may be configured to increase workspace productivity and allow performing scrolling more intelligently without requiring use and/or installation of new hardware (e.g., computer hardware, new computer mouse, etc.). As part of the contextual scrolling, the current subject matter may be configured to provide one or more of the following example functionalities that may be integrated with any computer mouse and may be selectable and/or executed within a user interface window (such as a window 102 as shown in FIG. 1): a contextual scroll back control functionality, a rapid scroll functionality to scroll to a top and/or a bottom of, for instance, documents, web pages, text, images, graphics, videos, etc., using a single mouse scroll input, a recommendation of rapid scroll functionality, an intelligent semantic automatic scroll functionality that may be based on a content (e.g., of documents, web pages, text, images, graphics, videos, etc.) in conjunction with a key (e.g., keyboard) shortcut, a page-wise scroll functionality, a turn vertical scroll control of a mouse into a horizontal scroll with a keyboard shortcut, and other functionalities.

Figure 1:
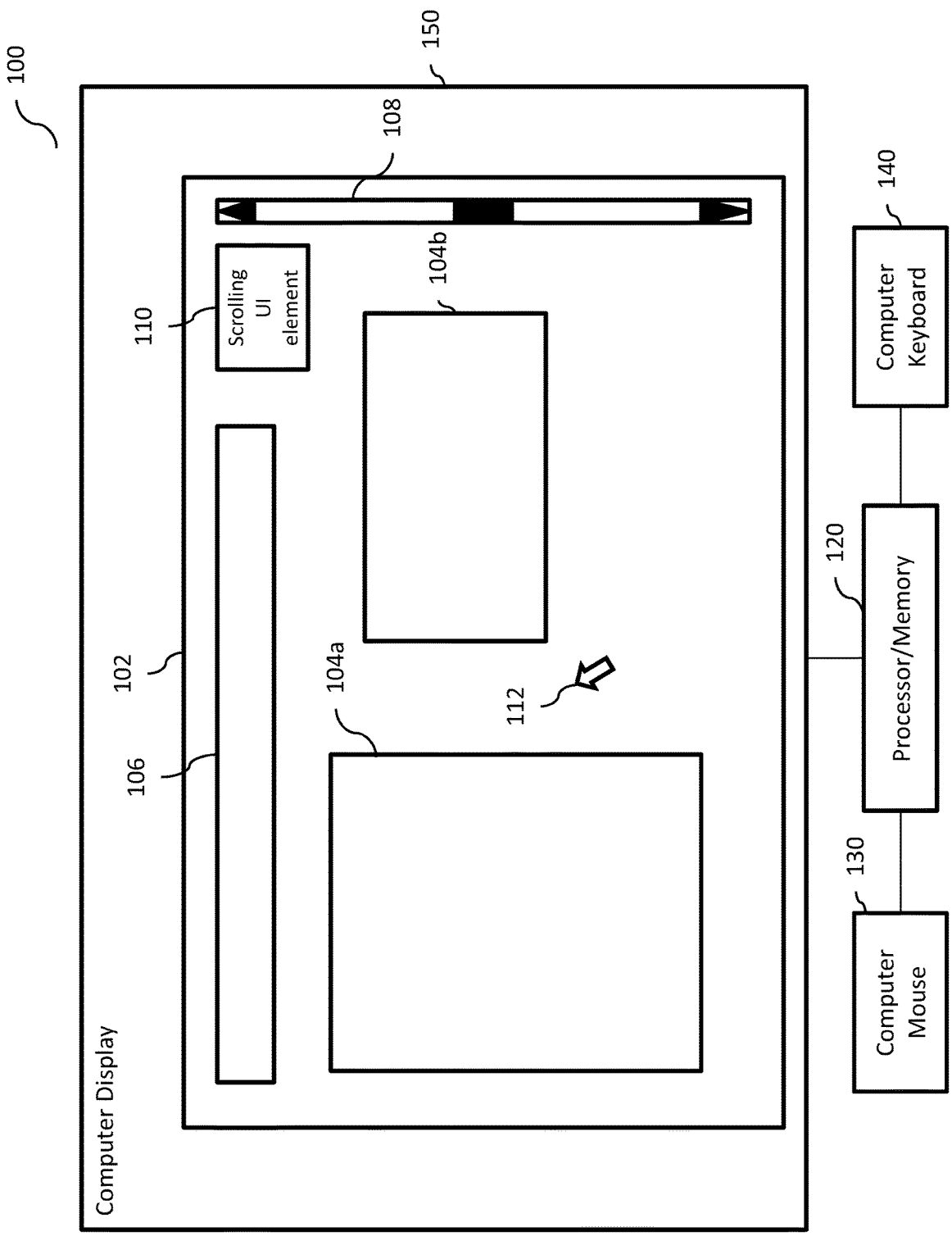
FIG. 1 illustrates an exemplary computing system that may be configured to execute contextual scrolling, according to some implementations of the current subject matter.

FIG. 1 illustrates an exemplary computing system 100 that may be configured to execute contextual scrolling, according to some implementations of the current subject matter. The system 100 may be configured to include a processor and/or memory component 120, a computer mouse 130, a computer keyboard 140, and a computer display 150. The computer display 150, upon instruction from the processor 120, may be configured to display a user interface window 102 (e.g., a user interface window that may be currently displayed to a user (user not shown in FIG. 1) on a computer monitor 150), where the window 102 may include one or more user interface elements 104 (a, b) (e.g., images, text, action buttons, etc.), an action bar 106 (e.g., an address bar for a web page, a button bar for a text editing program, etc.), a scroll bar 108 (e.g., to allow scrolling up, down, left, right (a vertical scroll bar is shown in FIG. 1, but other scroll bars may be used)), and a scrolling user interface (UI) element 110. A computer mouse pointer 112 may also be displayed within the window 102 and may be used to click on, select, etc. various user interface elements using the user's computer mouse. The scrolling UI element 110 may be configured to be executed by the component 120 using a corresponding software application that may be stored in the memory of the component 120. The scrolling UI element 110 may be configured to provide contextual scrolling functionalities, such as those listed above and discussed below.

The computing system 100 may be configured to be implemented in one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

The user interface window 102 may be displayed on one or more computer displays 150 that may form part of the system 100 and which may be part of one or more user devices, servers, etc. The user devices, servers, etc. may be equipped with video, audio, file sharing, user interfaces, etc. hardware and/or software capabilities as well as any other computing and/or processing capabilities.

The system 100, such as by using scrolling UI element 110, may be configured to provide one or more contextual scroll back control functionalities for users of such user devices, servers, etc. Such functionalities may be selectable (automatically, manually, dynamically, etc.) by the system 100 upon detection of a specific action that may be performed within user interface. The contextual scroll back control functionality may be implemented in the computer system 100 by executing scrolling (and/or taking the computer mouse pointer and/or the user) to a position within the user interface window where the computer mouse pointer was previously located (e.g., the user was typing/editing in a form/document, reading, viewing, etc.). In particular, the scrolling UI element 110 may be activated (e.g., displayed, become active, etc., such as by the component 120) on demand to allow availability of contextual scrolling, such as, upon detection that the user may have scrolled to another location in the window 102, the user may have executed a different function (e.g., user was typing first, then scrolled to another location, etc.). The user may then align the mouse pointer 112 (associated with the computer mouse 130) with the element 110 and click one of the buttons on the computer mouse to utilize the contextual scroll back control functionality. As stated above, various contextual factors may be used to determine when the scrolling UI element may be activated. One of the factors may involve changes of executed user interface functions, e.g., a user may be typing and/or entering data in a form displayed on the window 102 and then scrolls to another position within the window 102. Another example factor may involve an extent of scrolling performed by the user, e.g., the scroll extent for moving from position A to B within the window 102 is greater than a predetermined threshold scrolling range, e.g., N % scrolling of the overall scrolling range (where N may be configured). Other factors may be used in determining when to activate the element 110 and provide availability of contextual scrolling. Further, the scrolling UI element 110 may be deactivated and/or disappear from the window 102 when the contextual scrolling is no longer needed, and/or becomes not available, such as, upon detecting that the user has returned to the original contextual functions, e.g., the user is back to entering/typing, as in the above example. In some implementations, the scrolling UI element 110 may also include an indication (e.g., a description) of a location, context, etc. of where the user may be re-directed if the user clicks on the element 110.

Figure 2:
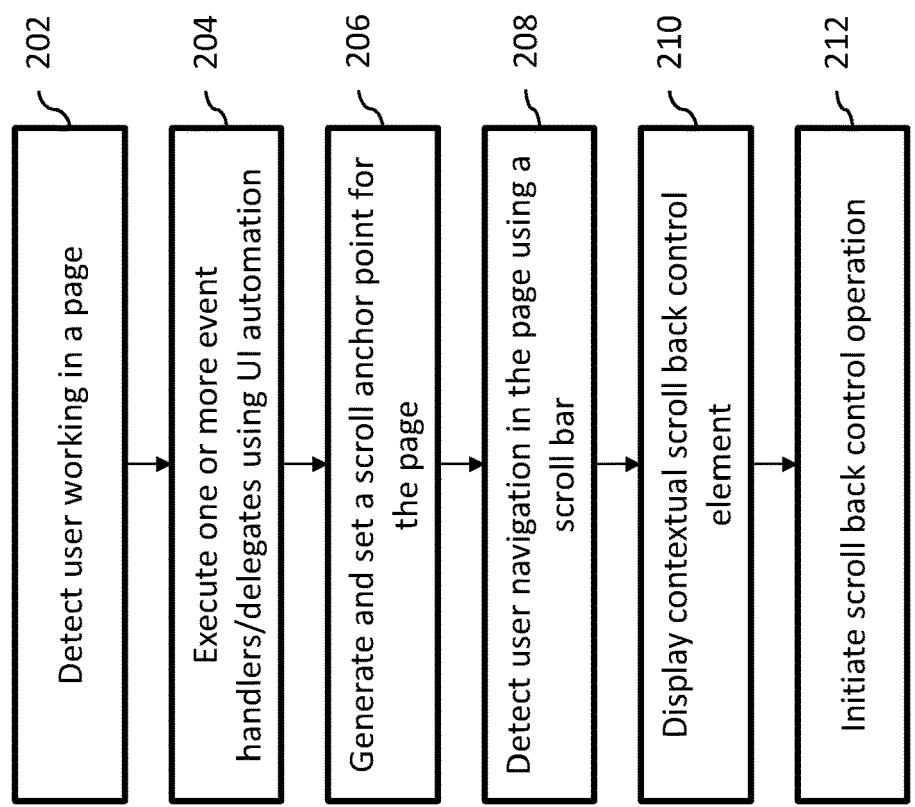
FIG. 2 illustrates an exemplary contextual scroll back process, according to some implementations of the current subject matter.

FIG. 2 illustrates an exemplary contextual scroll back process 200, according to some implementations of the current subject matter. The process 200 may be configured to be performed by the system 100. At 202, the system 100 may be configured to detect that the user is working in a page (e.g., opened a file in the window 102, typing in a form in the window 102, etc.). The page may be opened using a software application's browser, window, etc., which may be executed using the component 120. One or more scroll bars 108 may also appear in the page.

At 204, one or more event handlers and/or delegates may be executed/setup using various UI automation processes (e.g., built into Windows OS systems) and/or web page HTML element event handlers, and/or executed in any other ways. Execution of such event handlers/delegates may be configured to allow scroll bar UI control operations, which may indicate use of scroll bars, current scroll bar position(s), total range of the scrolls, etc. Further, event handlers for the page/window and UI elements may be setup to detect when a user is typing, e.g., in some form of control, focuses cursor within the application, makes a selection within the application, etc.

At 206, a scroll anchor point may be generated and/or setup for a particular page. The scroll anchor point may be indicate a position of one or more elements, a scroll bar, a mouse pointer, etc. in the window 102. The scroll anchor point may be generated/setup using at least one of the following options. The system 100 may detect that the user focused within an input element (e.g., FocusChange event may be executed to identify an UI/HTML element as a scroll anchor point). Alternatively, or in addition to, the system 100 may detect a keystroke event, a value change, etc. and may then identify the UI/HTML element corresponding to the keystroke event, value change, etc. as a scroll anchor point. For example, the system 100 may detect that the user typed within an input element (e.g., element 104*a*), changed a value in a table, etc. Moreover, the system 100 may detect a selection event a particular user interface element and identify it as a scroll anchor point. Further, the system 100 may be configured to determine and store the scroll bar 108's current position in the scroll anchor point. The scroll anchor point values may be stored in a memory of the system 100.

At 208, the system 100 may detect navigation with the page using the scroll bar 108. The system 100 may navigation to a different/new/etc. region on the page/application/etc. The system 100 may then determine and store the new scroll bar position based on the detected navigation.

At 210, as a result of the navigation, the system 100 may display the scrolling UI element 110 to allow for scroll back control. Further, the system 100 may determine that the new scroll bar position is different than the original or previous scroll bar position. For example, this may be determined using one or more predetermined thresholds that may be indicative of a percentage change in a scroll position of the scroll bar 108.

The system 100 may also detect that the scrolling UI element 110 has been activated (e.g., clicked on) and may initiate/execute scroll back operation using the stored scroll anchor point, at 212. For example, scroll and/or scrollIntoView function may be used to bring the UI/HTML element stored in the scroll anchor point. Alternatively, or in addition to, a scroll bar position stored in the scroll anchor point may be used to return to the previous position of the scroll bar, mouse pointer, etc.

In some implementations, the system 100 may be used to execute a rapid scroll functionality to scroll to top and/or bottom (and/or left/right/diagonally/any other direction) using a single computer mouse scroll input. In some example implementations, this functionality may be executed by clicking on the UI element 110 and/or by pressing one or more computer keyboard keys (e.g., SHIFT key and/or any other key). The UI element 110 and/or keyboard key may be configured so that when clicked on/pressed while a scroll operation is being performed, the scrolling may be accelerated (from the scrolling original scrolling speed). The accelerated scrolling may be performed in any desired direction. Further, accelerated scrolling may be performed without use of scroll bars (e.g., scroll bar 108 shown in FIG. 1). In some example implementations, execution of one or more N scrolls within a predetermined period of time (e.g., N times within M seconds, where N and M may be configurable (e.g., N=4, M=1 seconds)), may invoke the rapid scroll functionality as well. In some exemplary implementations, an interval between each scroll may also be used to determine whether the user may be intending to scroll to the top and/or the bottom of the page and/or user interface. For example, a user may typically perform consecutive scrolls much faster to scroll to the top and/or the bottom as compared to a shorter scrolling interval when the user does not intend to scroll to the top and/or the bottom. In some implementations, the current subject matter may implement a machine learning algorithm that may be based on data from prior scrolling intervals and/or intended scroll-to locations by the user (and/or other users) to classify N scroll operations into "scroll-to-end" (top and/or bottom and/or any other direction) versus "not scroll-to-end".

Figure 3:
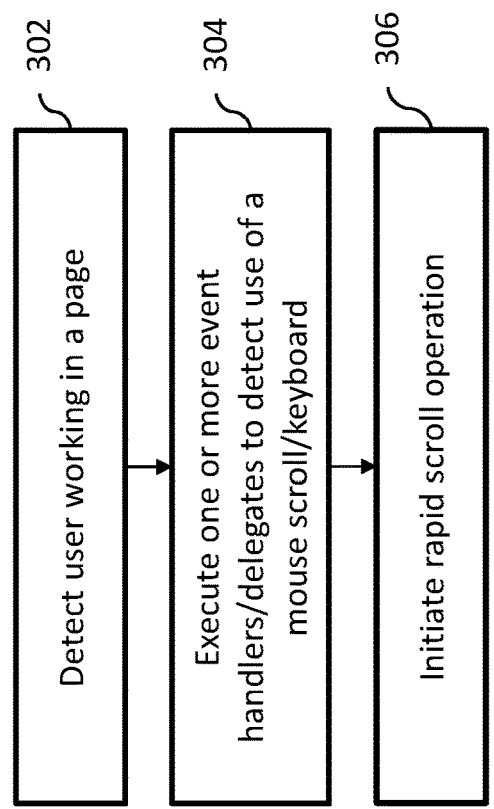
FIG. 3 illustrates an exemplary rapid scroll process, according to some implementations of the current subject matter.

FIG. 3 illustrates an exemplary rapid scroll process 300, according to some implementations of the current subject matter. The process 300 may be configured to be performed by the system 100. At 302, the system 100 may be configured to detect that the user is working in a page (e.g., opened a file in the window 102, typing in a form in the window 102, etc.). The page may be opened using a software application's browser, window, etc., which may be executed using the component 120. One or more scroll bars 108 may be displayed.

At 304, one or more event UI/mouse/keyboard handlers may be executed/setup to detect initiation of a mouse scroll and/or keyboard key press and/or clicking on the UI element 110. The system 100 may be configured to determine and store a direction of the scrolling as part of the event handler. Using the determined direction, the system 100 may be configured to (e.g., through use of UI automation) initiate the rapid scrolling, at 306, by executing scrolling of the page/window to the top, bottom, left, right, diagonally, and/or in any other desired direction.

In some implementations, the system 100 may be configured to execute a recommendation of rapid scroll functionality. For example, the system 100 may be configured to detect that a user scrolled to the top and/or bottom (e.g., right, left, diagonally, or in any other direction) but did not use the rapid scroll functionality discussed above. In this case, the system 100 may be configured to generate and display an alert (e.g., within window 102) to the user indicating that a rapid scroll functionality can be used to advance to user-desired location quicker.

Figure 4:
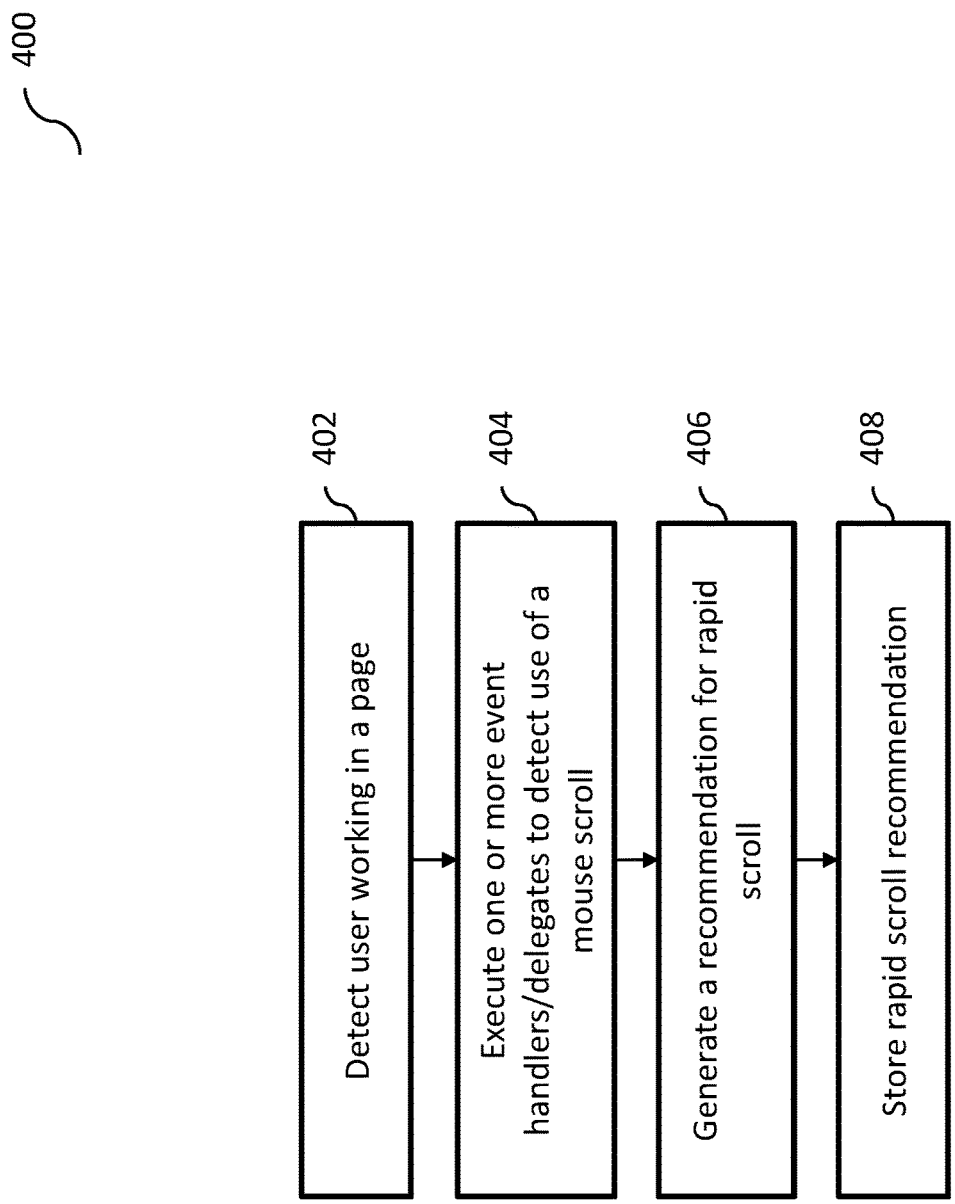
FIG. 4 illustrates an exemplary recommendation of a rapid scroll process, according to some implementations of the current subject matter.

FIG. 4 illustrates an exemplary recommendation of a rapid scroll process 400, according to some implementations of the current subject matter. The process 400, similar to processes 200 and 300 shown in FIGS. 2 and 3, respectively, may be configured to be performed by the system 100. At 402, the system 100 may be configured to detect that the user is working in a page. The page may be opened using a software application's browser, window, etc., which may be executed using the component 120. One or more scroll bars 108 may be displayed.

At 404, one or more event UI/mouse/keyboard handlers may be executed/setup to detect initiation of a mouse scroll in a particular direction (e.g., up, down, left, right, diagonally, and/or in any other direction). The system 100 may be configured to determine and store a direction of the scrolling as part of the event handler. For example, this may be accomplished using UI automation ScrollPattern and ScrollPattern. ScrollPatternInformation functionalities, which may be used to determine a current scroll position and/or whether the scrolling is at the top or bottom (and/or any other location).

At 406, the system 100 may be configured to generate a recommendation for rapid scrolling based on the detected scrolling. The recommendation may be displayed in the window 102 (e.g., as a pop-up window, as another window, etc.). The displayed recommendation may also indicate to the user how to use and configure rapid scroll functionality (e.g., as discussed above with regard to FIG. 3), as well as configure UI element 110 and/or keyboard shortcuts for use with rapid scrolling. At 408, the recommendation may be stored by the system 100 in its memory. The recommendation may be recalled upon detection of scrolling (e.g., using the process 300 shown in FIG. 3). It may also be used by other computing devices and/or any other computing sessions.

In some implementations, the system 100 may also be configured to execute an intelligent semantic automatic scroll functionality. This functionality may use various contextual, content, and/or semantic features of user interface elements (e.g., elements 104) to automatically determine a location on the user interface window 102 the user wishes to scroll to and advance the user to that location. In some example implementations, the automatic scroll functionality may be implemented using a keyboard key short. For example, a user may click on the UI element 110 and/or press a key on a keyboard while scrolling down (up/left/right/diagonally/any other direction) using the computer mouse, the system 100 may then scroll to the next section of the window based on the header section within the currently displayed window. In another example, the user, while using a software program, may press a key on a keyboard while scrolling (down/up/left/right/diagonally/any other direction) using a computer mouse, and the system 100 may be configured to execute a next function of the software program.

Figure 5:
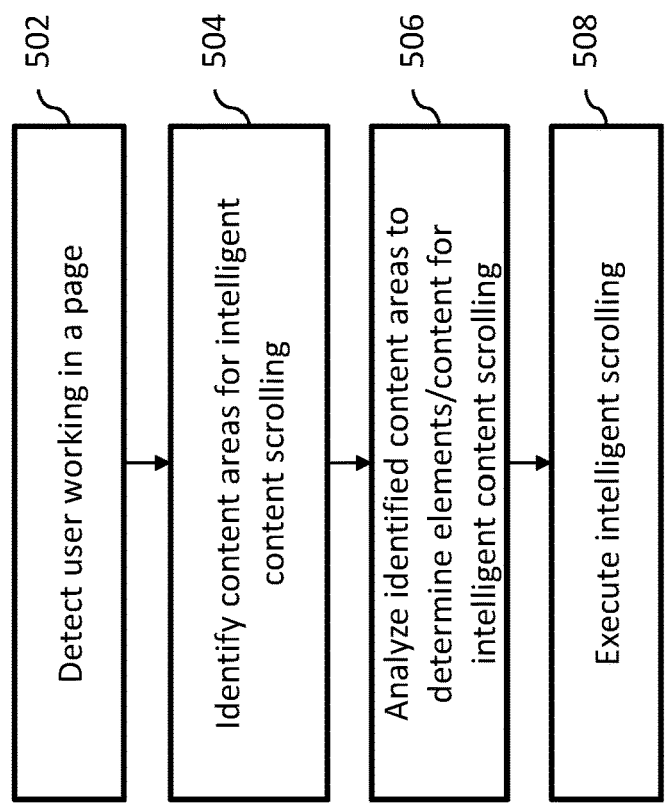
FIG. 5 illustrates an exemplary intelligent semantic automatic scroll process, according to some implementations of the current subject matter.

FIG. 5 illustrates an exemplary intelligent semantic automatic scroll process 500, according to some implementations of the current subject matter. The process 500, similar to processes 200, 300, 400 discussed above, may be configured to be performed by the system 100. At 502, the system 100 may be configured to detect that the user is working in a page. The page may be opened using a software application's browser, window, etc., which may be executed using the component 120. One or more scroll bars 108 may be displayed.

At 504, the system 100 may be configured (e.g., using UI automation functionalities) to identify one or more input content areas (e.g., text, text area, image area, etc. within user interface elements 104 (a, b)) that may be enabled for intelligent content scroll. For example, a user interface window 102 may include many such input content areas. The system 100 may determine dimensions of the input content area.

At 506, the identified content input area may be analyzed to determine one or more elements and/or content for which intelligent scrolling may be executed. For example, such elements/content may include, but is not limited to, a function and/or a class names in a code file; one or more header elements in a webpage, etc.

At 508, the intelligent scrolling operation may be executed by the system 100. For example, upon detecting scrolling in the window 102 (and/or elements 104), the next element that is not in the currently displayed view may be identified and scrolled to by the system 100. In some example implementations, element's offset and/or offset parent attributes may be used to determine whether an element is or is not being displayed. Alternatively, or in addition to, a number of lines between the current position of the element in the view area and the next content may be determined by the system 100. Using the determined number of lines, the system 100 may be configured to move the scrollbar 108 to bring up the next content (e.g., using .scroll, .scrollintoview, etc. functions).

In some implementations, the system 100 may also execute a page-wise scrolling functionality. The page wise scrolling functionality may be triggered either manually, automatically, dynamically, etc. based on a content and/or user preferences that may allow page-wise scrolling so that a content from a previous view prior to the initiation of the scrolling is not shown in the window 102. This functionality may be executed to allow user to skip from one page to another quickly while viewing the window 102.

Figure 6:
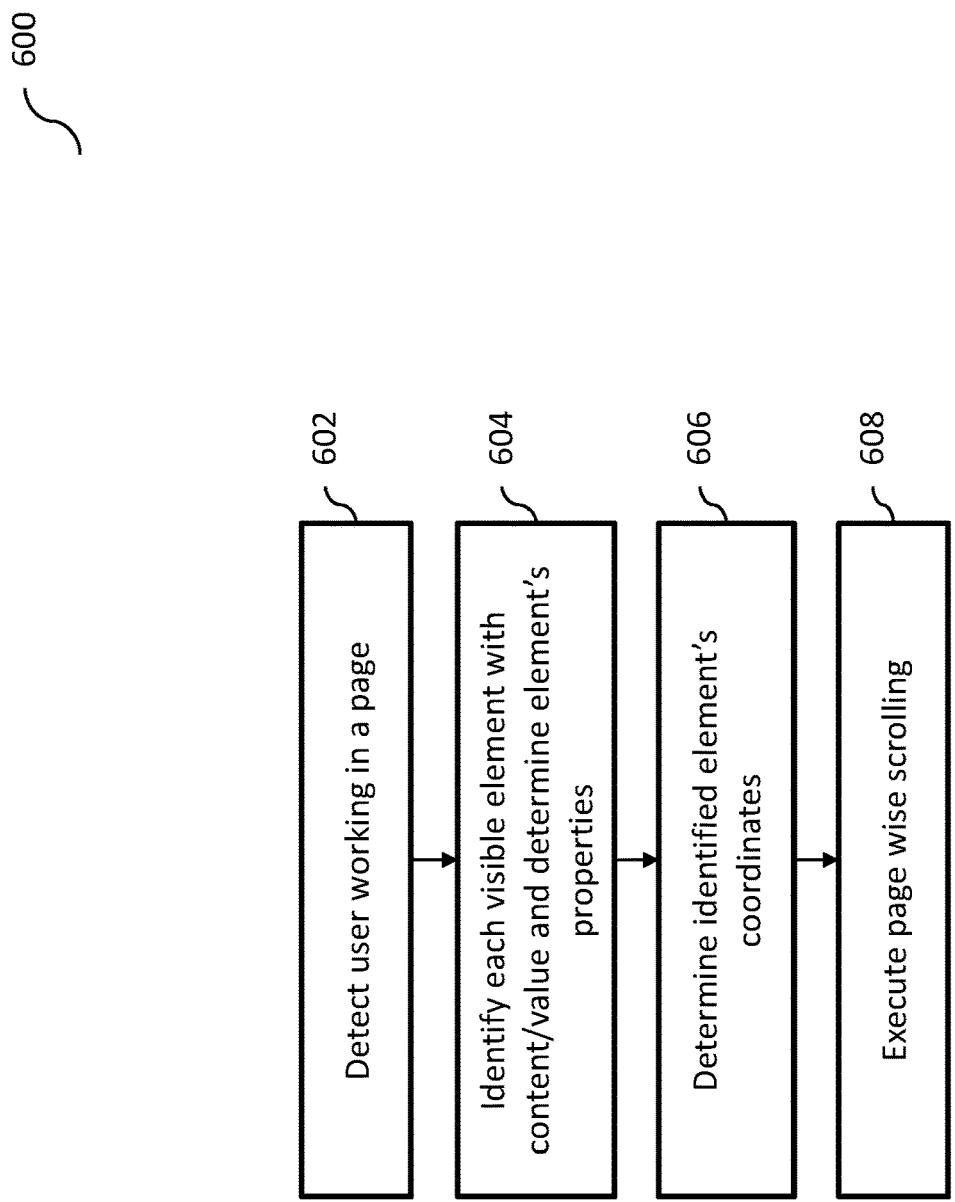
FIG. 6 illustrates an exemplary page-wise scrolling process, according to some implementations of the current subject matter.

FIG. 6 illustrates an exemplary page-wise scrolling process 600, according to some implementations of the current subject matter. The process 600, similar to processes 200, 300, 400, 500 discussed above, may be configured to be performed by the system 100. At 602, the system 100 may be configured to detect that the user is working in a page. The page may be opened using a software application's browser, window, etc., which may be executed using the component 120. One or more scroll bars 108 may be displayed.

At 604, the system 100 may be configured to identify each visible element that may include content and/or value (e.g., text value, etc.). Further, the system 100 may also determine and/or store the identified element's properties. The properties may include, for example, but are not limited to, location/coordinates of the element (e.g., top, left, bottom, right, etc.), at 606. In some example implementations, the system 100 may also sort the identified elements using elements' vertical or Y coordinates. The elements may also be sorted using any other parameters. For example, elements that may be visible at the top and/or bottom in the window 102 (and/or elements 104) may be identified using element coordinates and/or view area dimensions (e.g., Y-top dimension, such as, for example, TopViewElement-Y, BottomViewElement-Y).

The system 100 may then detect that the UI element 110 may have been clicked or and/or otherwise activated and thus, the page wise scrolling functionality has been triggered, at 608. Once activated, the page wise scrolling functionality may allow scrolling by pages, elements, etc. For example, for page wise scrolling up, an element previous to TopViewElement-Y may be identified from a list of coordinates, generated at 606, and the system 100 may execute scrolling until the identified element identified is at the bottom in the view. For page wise scrolling down, an element next to BottomViewElement-Y may be identified from the list, generated at 606, and the system 100 may be configured to execute scrolling until the identified element is at the top in the view.

In some implementations, the system 100 may be configured to switch between directions of scrolling. For example, a vertical scroll control of the computer mouse may be switched to a horizontal scroll control. This may be accomplished using the element 110 and/or a keyboard shortcut. This provides users with multi-directional computer mouse scrolling capabilities.

Figure 7:
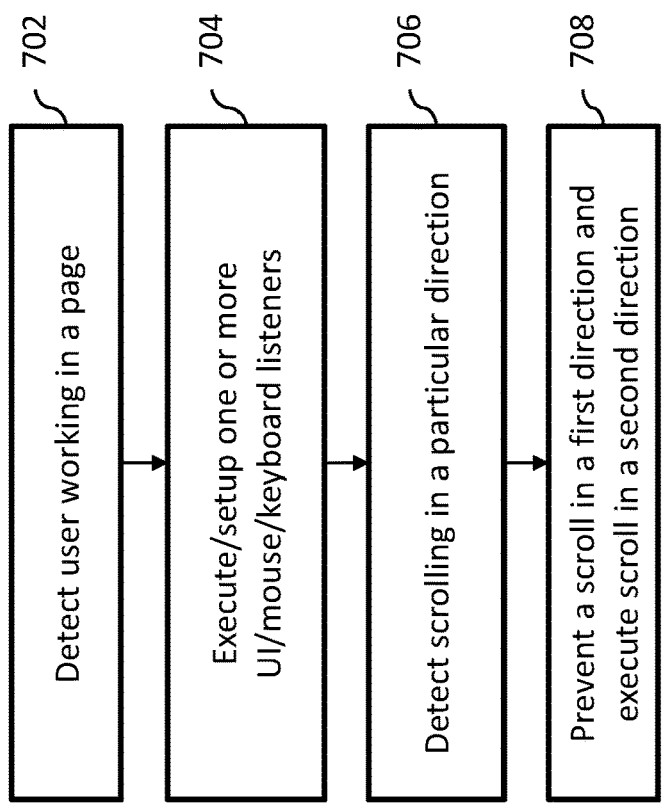
FIG. 7 illustrates an exemplary scroll direction switching process, according to some implementations of the current subject matter.

FIG. 7 illustrates an exemplary scroll direction switching process 700, according to some implementations of the current subject matter. The process 700, similar to processes 200-600 discussed above, may be configured to be performed by the system 100. At 702, the system 100 may be configured to detect that the user is working in a page. The page may be opened using a software application's browser, window, etc., which may be executed using the component 120. One or more scroll bars 108 may be displayed.

At 704, the system 100 may be configured to execute/setup one or more UI/mouse/keyboard listeners to detect whether the scrolling in a particular direction (e.g., vertical direction) is being performed. At 706, the system 100 may detect scrolling in a particular direction (e.g., vertical). In some example implementations, the UI element 110 and/or a keyboard key may be configured as a shortcut to assist in detection of a direction of scrolling. At 708, the system 100 may be configured to prevent a vertical scroll (in an original or first direction) and may execute a horizontal scroll (e.g., using UI automation capabilities) (in a second direction).

In some example implementations, when the user brings the mouse over and/or near a position of the scrollbar, the current subject matter may be configured to generate a recommendation that the user use a specific directional scrolling (e.g., vertical, horizontal, etc.). For example, a recommendation (e.g., via another user interface, pop-up, etc.) can be generated to recommend that the user use a vertical scroll bar on the mouse (e.g., mouse wheel) to perform horizontal scrolling.

In some example implementations, the UI element 110 may be configured to show a small horizontal (vertical and/or any other direction) scrollbar area. If the user brings a mouse pointer over that scrollbar area and performs vertical scrolling then the current subject matter may be configured to execute horizontal scrolling. Alternatively or in addition to, the current subject matter may be configured to detect when the user is performing horizontal scrolling and, based on the detection, recommend to the user (e.g., using another user interface, a popup, etc.) to perform scrolling in another direction and/or provide various details about the multi-direction scrolling feature (e.g., scroll vertically on the mouse for scrolling horizontally on the screen).

Figure 8:
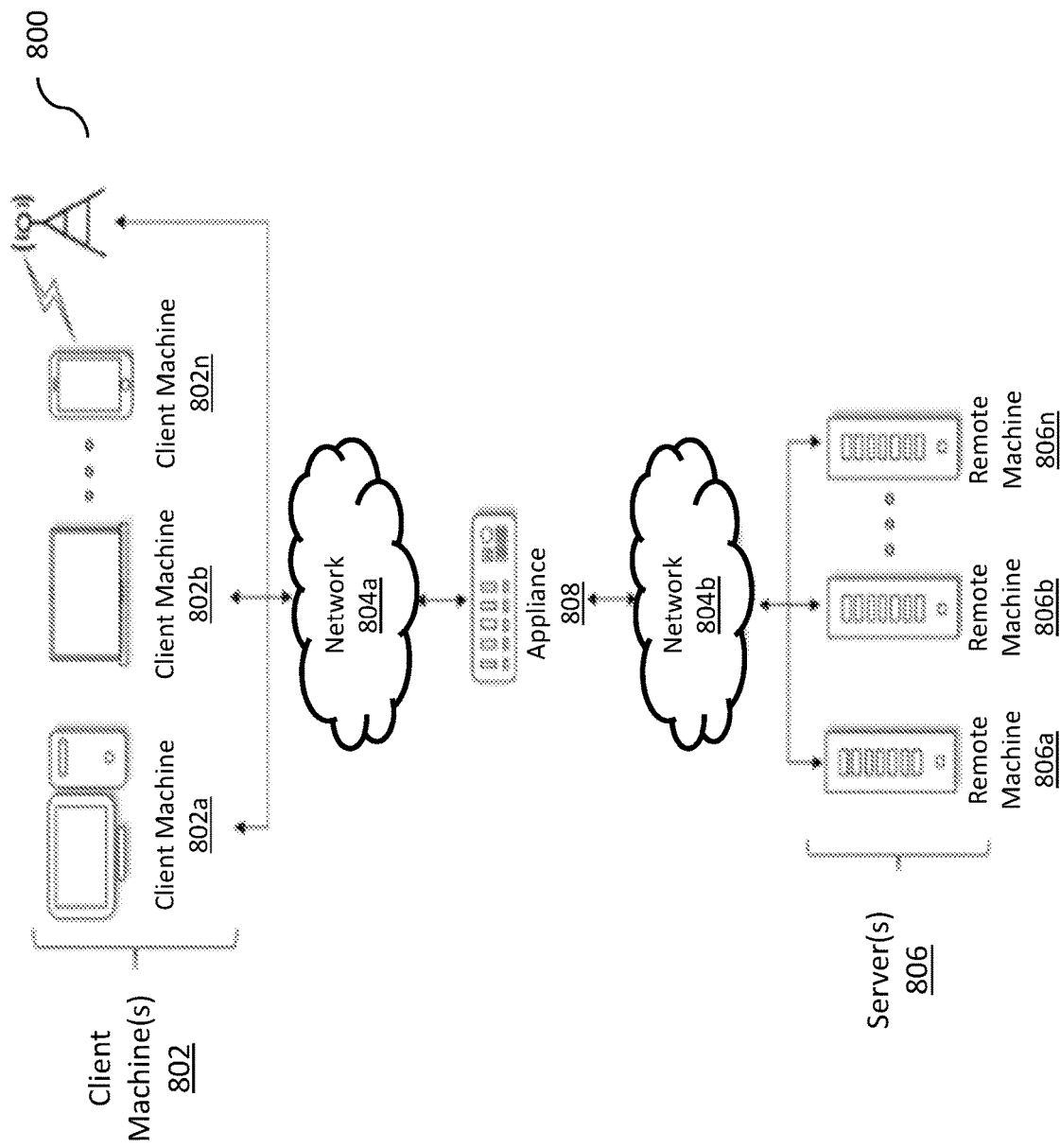
FIG. 8 illustrates an example of a network environment, according to some implementations of the current subject matter

FIG. 8 illustrates an example of a network environment 800, according to some implementations of the current subject matter. Referring to FIGS. 1-8, the network environment 800, in which various aspects of the disclosure may be implemented, may include one or more clients 802a-602n, one or more remote machines 806a-606n, one or more networks 804a and 804b, and one or more appliances 808 installed within the network environment 800. The clients 802a-602n communicate with the remote machines 806a-606n via the networks 804a and 804b.

In some example implementations, the clients 802a-602n may communicate with the remote machines 806a-606n via an appliance 808. The illustrated appliance 808 is positioned between the networks 804a and 804b, and may also be referred to as a network interface or gateway. In some example implementations, the appliance 808 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example implementations, multiple appliances 808 may be used, and the appliance(s) 808 may be deployed as part of the network 804a and/or 804b.

The clients 802a-602n may be generally referred to as client machines, local machines, clients, client nodes, client computers, client devices, computing devices, endpoints, or endpoint nodes. One or more of the clients 802a-602n may implement, for example, the client device 130 and/or the like. The remote machines 806a-606n may be generally referred to as servers or a server farm. In some example implementations, a client 802 may have the capacity to function as both a client node seeking access to resources provided by a server 806 and as a server 806 providing access to hosted resources for other clients 802a-602n. The networks 804a and 804b may be generally referred to as a network 804. The network 804 including the networks 804a and 804b may be configured in any combination of wired and wireless networks.

The servers 806 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 806 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example implementations, a server 806 may execute a remote presentation services program or other program that uses a thin-client or a remote-display protocol to capture display output generated by an application executing on a server 806 and transmit the application display output to a client 802.

In yet other example implementations, a server 806 may execute a virtual machine, such as the first virtual machine and/or the second virtual machine, to provide, for example, to the user at a client device, access to a computing environment such as the virtual desktop. The virtual machine may be managed by, for example, a hypervisor (e.g., a first hypervisor, a second hypervisor, and/or the like), a virtual machine manager (VMM), or any other hardware virtualization technique within the server 806.

In some example implementations, the network 804 may be a local-area network (LAN), a metropolitan area network (MAN), a wide area network (WAN), a primary public network, and/or a primary private network. Additional implementations may include one or more mobile telephone networks that use various protocols to communicate among mobile devices. For short-range communications within a wireless local-area network (WLAN), the protocols may include 1002.11, Bluetooth, and Near Field Communication (NFC).

Figure 9:
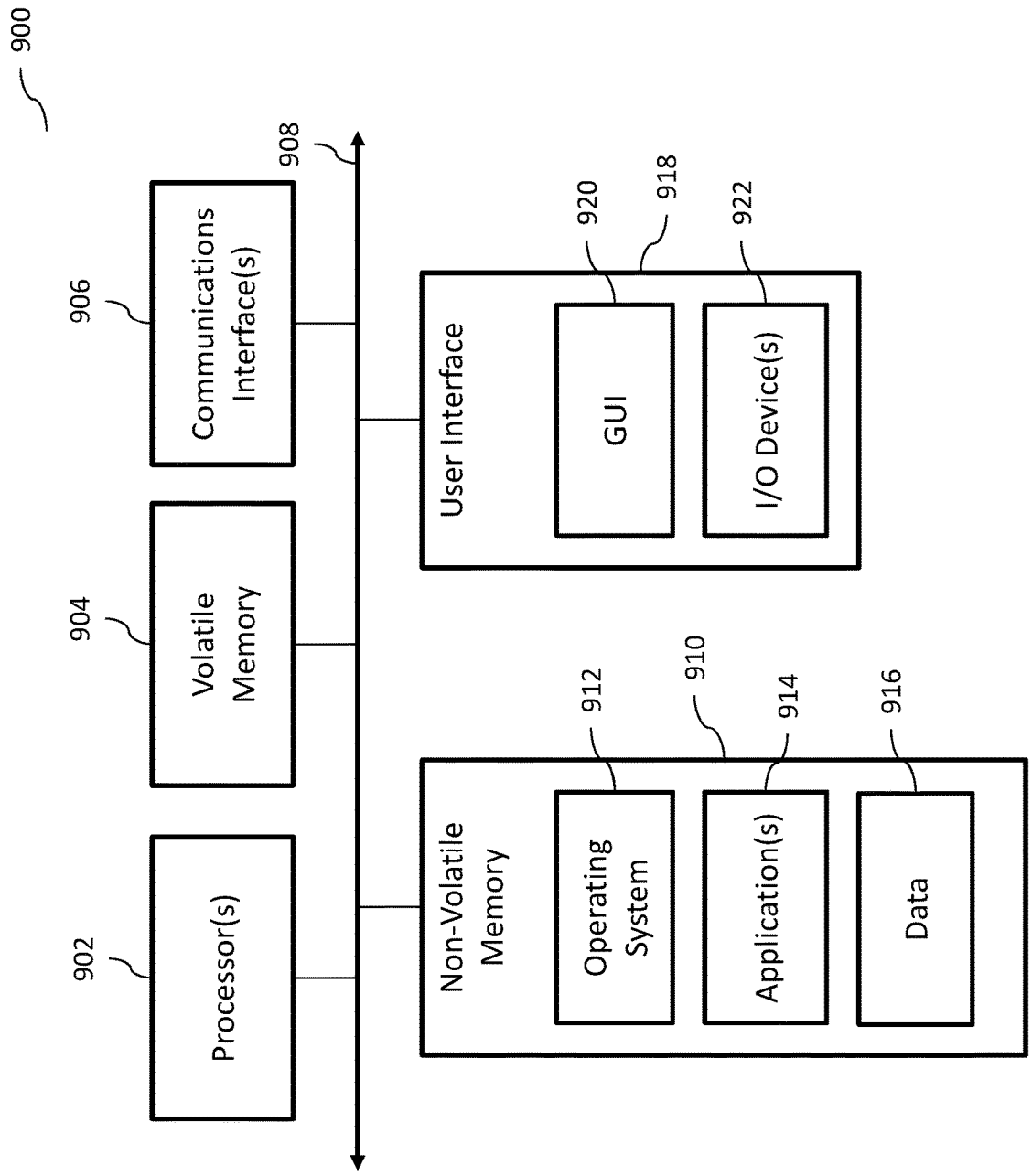
FIG. 9 depicts a block diagram illustrating an example of a computing device, according to some implementations of the current subject matter.

FIG. 9 depicts a block diagram illustrating an example of a computing device 900, in accordance with some example implementations. Referring to FIGS. 1-9, the computing device 900 may be useful for practicing an implementation of the system 100 and analysis engine 120.

As shown in FIG. 9, the computing device 900 may include one or more processors 902, volatile memory 904 (e.g., RAM), non-volatile memory 910 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 918, one or more communications interfaces 906, and a communication bus 908. The user interface 918 may include a graphical user interface (GUI) 920 (e.g., a touchscreen, a display, and/or the like) and one or more input/output (I/O) devices 922 (e.g., a mouse, a keyboard, and/or the like). The non-volatile memory 910 may store an operating system 912, one or more applications 914, and data 916 such that computer instructions of the operating system 912 and/or applications 914 are executed by the processor(s) 902 out of the volatile memory 904. Data may be entered using an input device of the GUI 920 or received from I/O device(s) 922. Various elements of the computing device 900 may communicate via communication the communication bus 908. The computing device 900 as shown in FIG. 9 is shown merely as an example, as the resource controller 150 and the client device 130 may be implemented by any computing or processing environment and with any type of machine or set of machines that may have suitable hardware and/or software capable of operating as described herein.

The processor(s) 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example implementations, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example implementations, the "processor" may be one or more physical processors or one or more "virtual" (e.g., remotely located or "cloud") processors.

The communications interfaces 906 may include one or more interfaces to enable the computing device 900 to access a computer network such as a local area network (LAN), a wide area network (WAN), a public land mobile network (PLMN), and/or the Internet through a variety of wired and/or wireless or cellular connections.

As noted above, in some example implementations, one or more computing devices 900 may execute an application on behalf of a user of a client computing device (e.g., clients 802), may execute a virtual machine, which provides an execution session within which applications execute on behalf of a user or a client computing device (e.g., clients 802), such as a hosted desktop session (e.g., a virtual desktop), may execute a terminal services session to provide a hosted desktop environment, or may provide access to a computing environment including one or more of: one or more applications, one or more desktop applications, and one or more desktop sessions in which one or more applications may execute.

Figure 10:
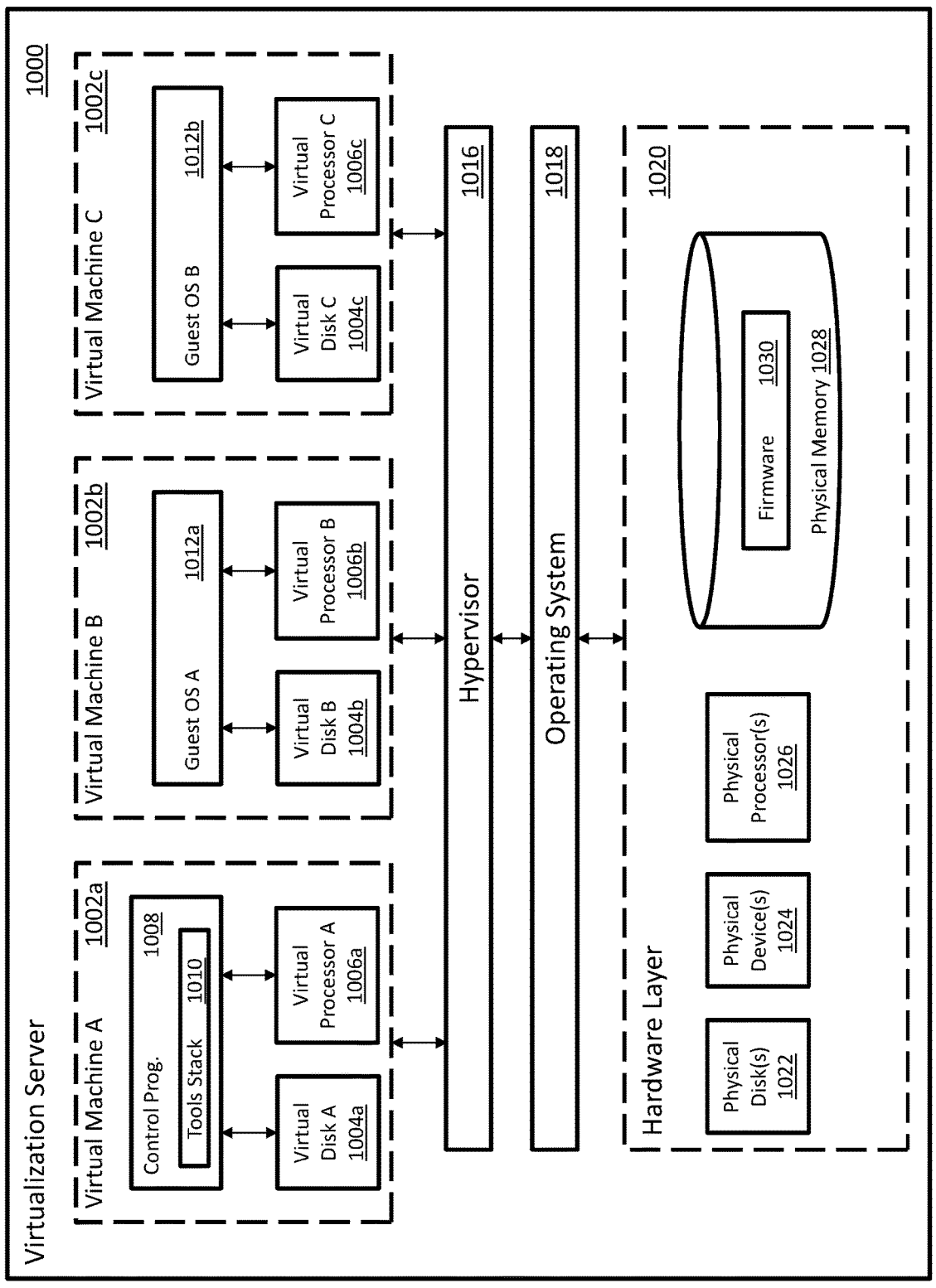
FIG. 10 illustrates a high-level architecture of an example of a virtualization system for implementing the computing system shown in FIG. 1, according to some implementations of the current subject matter.

FIG. 10 illustrates a high-level architecture of an example of a virtualization system for implementing the computing system 100, in accordance with some example implementations. As shown in FIG. 10, the virtualization system may be a single-server or multi-server system, or a cloud system, including at least one virtualization server 1000 configured to provide virtual desktops and/or virtual applications to one or more client access devices 802a-c. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 1000 may be configured as a virtualization server in a virtualization environment, for example, a single-server, multi-server, or cloud computing environment. Virtualization server 1000 illustrated in FIG. 10 may be deployed as and/or implemented by one or more implementations of server 806 illustrated in FIG. 8 or by other known computing devices. Included in virtualization server 1000 is hardware layer 1020 that may include one or more physical disks 1022, one or more physical devices 1024, one or more physical processors 1026, and one or more physical memories 1028. In some implementations, firmware 1030 may be stored within a memory element in physical memory 1028 and be executed by one or more of physical processors 1026. Virtualization server 1000 may further include operating system 1018 that may be stored in a memory element in physical memory 1028 and executed by one or more of physical processors 1026. Still further, hypervisor 1016 may be stored in a memory element in physical memory 1028 and be executed by one or more of physical processors 1026. Presence of operating system 1018 may be optional.

Executing on one or more of physical processors 1026 may be one or more virtual machines 1002A-C (generally, 1002). Each virtual machine 1002 may have virtual disk 1004A-C and virtual processor 1006A-C. In some implementations, first virtual machine 1002A may execute, using virtual processor 1006A, control program 1008 that includes tools stack 1010. Control program 1008 may be referred to as a control virtual machine, Domain 0, Dom0, or other virtual machine used for system administration and/or control. In some implementations, one or more virtual machines 1002B-C may execute, using virtual processor 1006B-C, guest operating system 1012A-B (generally, 1012).

Physical devices 1024 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 1000. Physical memory 1028 in hardware layer 1020 may include any type of memory. Physical memory 1028 may store data, and in some implementations may store one or more programs, or set of executable instructions. FIG. 10 illustrates an implementation where firmware 1030 is stored within physical memory 1028 of virtualization server 1000. Programs or executable instructions stored in physical memory 1028 may be executed by the one or more processors 1026 of virtualization server 1000.

Virtualization server 1000 may also include hypervisor 1016. In some implementations, hypervisor 1016 may be a program executed by processors 1026 on virtualization server 1000 to create and manage any number of virtual machines 1002. Hypervisor 1016 may be referred to as a virtual machine monitor, or platform virtualization software. In some implementations, hypervisor 1016 may be any combination of executable instructions and hardware that monitors virtual machines 1002 executing on a computing machine. Hypervisor 1016 may be a Type 2 hypervisor, where the hypervisor executes within operating system 1018 executing on virtualization server 1000. Virtual machines may then execute at a layer above hypervisor 1016. In some implementations, the Type 2 hypervisor may execute within the context of a user's operating system such that the Type 2 hypervisor interacts with the user's operating system. In other implementations, one or more virtualization servers 1000 in a virtualization environment may instead include a Type 1 hypervisor (not shown). A Type 1 hypervisor may execute on virtualization server 1000 by directly accessing the hardware and resources within hardware layer 1020. That is, while Type 2 hypervisor 1016 accesses system resources through host operating system 1018, as shown, a Type 1 hypervisor may directly access all system resources without host operating system 1018. A Type 1 hypervisor may execute directly on one or more physical processors 1026 of virtualization server 1000, and may include program data stored in physical memory 1028.

Hypervisor 1016, in some implementations, may provide virtual resources to guest operating systems 1012 or control programs 1008 executing on virtual machines 1002 in any manner that simulates operating systems 1012 or control programs 1008 having direct access to system resources. System resources can include, but are not limited to, physical devices 1024, physical disks 1022, physical processors 1026, physical memory 1028, and any other component included in hardware layer 1020 of virtualization server 1000. Hypervisor 1016 may be used to emulate virtual hardware, partition physical hardware, virtualize physical hardware, and/or execute virtual machines that provide access to computing environments. In still other implementations, hypervisor 1016 may control processor scheduling and memory partitioning for virtual machine 1002 executing on virtualization server 1000. Examples of hypervisor 1016 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 1000 may execute hypervisor 1016 that creates a virtual machine platform on which guest operating systems 1012 may execute. When this is the case, virtualization server 1000 may be referred to as a host server. An example of such a virtualization server is Citrix Hypervisor® provided by Citrix Systems, Inc., of Fort Lauderdale, Fla.

Hypervisor 1016 may create one or more virtual machines 1002B-C (generally, 1002) in which guest operating systems 1012 execute. In some implementations, hypervisor 1016 may load a virtual machine image to create virtual machine 1002. The virtual machine image may refer to a collection of data, states, instructions, etc. that make up an instance of a virtual machine. In other implementations, hypervisor 1016 may execute guest operating system 1012 within virtual machine 1002. In still other implementations, virtual machine 1002 may execute guest operating system 1012.

In addition to creating virtual machines 1002, hypervisor 1016 may control the execution of at least one virtual machine 1002. The hypervisor 1016 may present at least one virtual machine 1002 with an abstraction of at least one hardware resource provided by virtualization server 1000 (e.g., any hardware resource available within hardware layer 1020). In some implementations, hypervisor 1016 may control the manner in which virtual machines 1002 access physical processors 1026 available in virtualization server 1000. Controlling access to physical processors 1026 may include determining whether virtual machine 1002 should have access to processor 1026, and how physical processor capabilities are presented to virtual machine 1002.

As shown in FIG. 10, the virtualization server 1000 may host or execute one or more virtual machines 1002. Virtual machine 1002 may be a set of executable instructions and/or user data that, when executed by processor 1026, may imitate the operation of a physical computer such that virtual machine 1002 can execute programs and processes much like a physical computing device. While FIG. 10 illustrates an implementation where virtualization server 1000 hosts three virtual machines 1002, in other implementations virtualization server 1000 may host any number of virtual machines 1002. Hypervisor 1016 may provide each virtual machine 1002 with a unique virtual view of the physical hardware, including memory 1028, processor 1026, and other system resources 1022, 1024 available to that virtual machine 1002. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 1016 may create one or more unsecure virtual machines 1002 and one or more secure virtual machines 1002. Unsecure virtual machines 1002 may be prevented from accessing resources, hardware, memory locations, and programs that secure virtual machines 1002 may be permitted to access. In other implementations, hypervisor 1016 may provide each virtual machine 1002 with a substantially similar virtual view of the physical hardware, memory, processor, and other system resources available to virtual machines 1002.

Each virtual machine 1002 may include virtual disk 1004A-C (generally 1004) and virtual processor 1006A-C (generally 1006.) Virtual disk 1004 may be a virtualized view of one or more physical disks 1022 of virtualization server 1000, or a portion of one or more physical disks 1022 of virtualization server 1000. The virtualized view of physical disks 1022 may be generated, provided, and managed by hypervisor 1016. In some implementations, hypervisor 1016 may provide each virtual machine 1002 with a unique view of physical disks 1022. These particular virtual disk 1004 (included in each virtual machine 1002) may be unique, when compared with other virtual disks 1004.

Virtual processor 1006 may be a virtualized view of one or more physical processors 1026 of virtualization server 1000. The virtualized view of physical processors 1026 may be generated, provided, and managed by hypervisor 1016. Virtual processor 1006 may have substantially all of the same characteristics of at least one physical processor 1026. Virtual processor 1026 may provide a modified view of physical processors 1026 such that at least some of the characteristics of virtual processor 1006 are different from the characteristics of the corresponding physical processor 1026.

Figure 11:
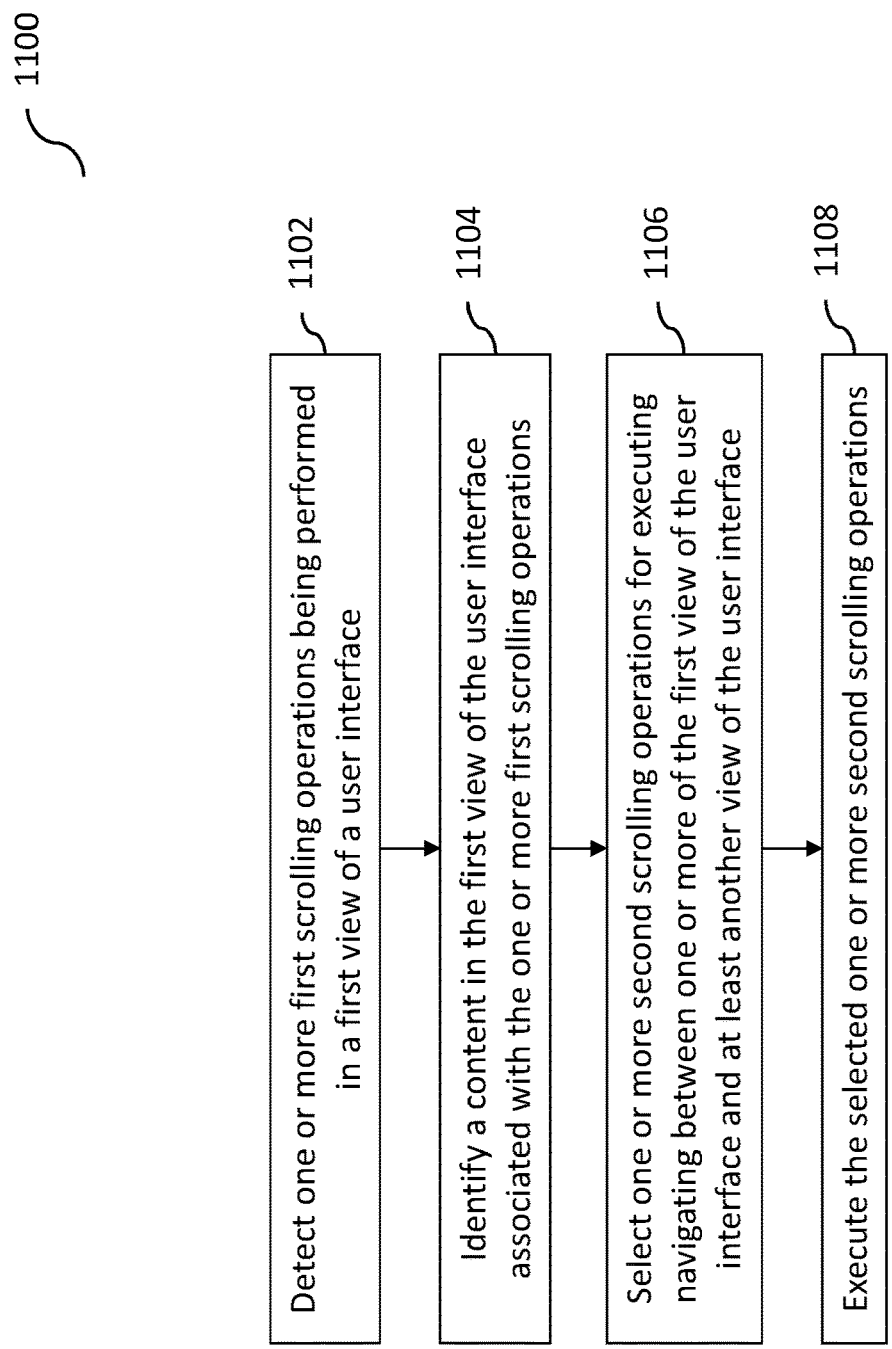
FIG. 11 illustrates an example of a method, according to some implementations of the current subject matter.

FIG. 11 illustrates an example of a method 1100 for performing contextual scrolling, according to some implementations of the current subject matter. The method 1100 may be performed by the system 100 shown in FIG. 1 using one or more of the processes shown in FIGS. 2-7. At 1102, one or more first scrolling operations (e.g., scrolling using scroll bar 108, moving mouse pointer within window 102, etc.) being performed in a first view (e.g., window 102, user interface elements 104, etc.) of a user interface. The first scrolling operations may be associated with one or more operations of a computer mouse (e.g., computer mouse 130). Alternatively, or in addition to, contextual scrolling may be executed on and/or using any device, such as, for example, a smartphone, a tablet computer, a laptop, a personal computer, a personal digital assistant, and/or any other device. The contextual scrolling may be performed with and/or without use of a computer mouse (e.g., using a finger, a stylus pen, etc.).

At 1104, the system 100 may be configured to identify a content in the first view of the user interface associated with the first operations. For example, the user may be typing text, filling in a form, viewing a webpage, etc.

At 1106, the system 100 may be configured to select one or more second scrolling operations for executing navigation between one or more of the first view of the user interface and at least another view of the user interface (e.g., another window 102, another element 104, another webpage, another portion of the same page, etc.). The selection may be performed based on the first operations and the identified content. The second operations may be one or more operations discussed above with regard to FIGS. 2-7 (e.g., scroll back, rapid scroll, etc.). At 1108, the system 100 may be configured to execute the selected second scrolling operations.

In some implementations, the current subject matter can include one or more of the following optional features. The first and second operations may be scrolling operations associated with one or more operations of the computer mouse, and/or a computer keyboard, a touch screen, a smartphone, a tablet computer, a laptop, a personal computer, a personal digital assistant, an audio device, a speech-to-text/speech-recognition computing device (for example, a user providing audio instructions (which may be converted to computing commands) to advance and/or scroll from one portion of a user interface (e.g., an image) to another portion of the user interface (e.g., another image), as discussed herein), a virtual/augmented reality computing device (e.g., user may use hand gestures to indicate user's intention to scroll, as discussed herein), and/or any other device. In some implementations, the system 100 may identify a first location of at least one of: a graphical pointer (e.g., of the computer mouse, etc.) and a scroll bar in the user interface. The system 100 may then determine a second location of at least one of: the graphical pointer and the scroll bar, and scroll, using the executed selected second operations, to the identified first location (e.g., a scroll back functionality discussed above in connection with FIG. 2).

In some implementations, the system 100 may detect a plurality of first operations being performed within a predetermined period of time. The system 100 may then select a second operation to correspond to the plurality of first operations (e.g., a rapid scroll operation discussed above in connection with FIGS. 3-4).

In some implementations, the first view may include a first element of the user interface. The system 100 may then select one or more second operations to navigate to a second element of the user interface. The second element may be located in at least one of the first view and at least another view. This may be similar to intelligent content based and/or page wise scrolling functionalities discussed above with regard to FIGS. 5-6.

In some implementations, one or more first operations may include one or more scrolling operations executed in a first direction. One or more second operations may include one or more scrolling operations executed in a second direction. The first and second directions may be different upon system 100's selection of the second operations. This may be similar to the ability to switch directions of scrolling, as discussed in connection with FIG. 7 above.

In some implementations, at least one of the first and second scrolling operations may include at least one of the following: a scrolling operation in a horizontal direction, a scrolling operation in a vertical direction, a scrolling operation in a diagonal direction, a scrolling operation in one or more directions, and any combination thereof.

In some implementations, selection of the second scrolling operations may include selecting one or more second scrolling operations based on an interval between one or more first scrolling operations. Further, selection of the second scrolling operations may include selecting a scrolling direction of one or more second scrolling operations based on a detected scrolling direction of one or more first scrolling operations.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   detecting a first scrolling operation being performed in a first view of a user interface, the first scrolling operation being of a first type;
   identifying a content displayed in the first view of the user interface, the content being scrolled through using the first scrolling operation;
   determining that the first scrolling operation exceeded a predetermined scrolling threshold;
   selecting, based on the first scrolling operation, the content, and a determination that the first scrolling operation exceeded the predetermined scrolling threshold, a second scrolling operation for executing navigation between one or more of the first view of the user interface and at least another view of the user interface;
   executing the second scrolling operation of a second type;
   detecting a return to the content displayed in the first view of the user interface; and
   deactivating a scrolling element associated with the second scrolling operation of the second type in the first view of the user interface.

2. The computer-implemented method of claim 1, wherein at least one of the first and second scrolling operations are scrolling operations associated with one or more operations of the at least one of: a computer mouse, a computer keyboard, a smartphone, a tablet computer, a laptop, a personal computer, a personal digital assistant, a touch screen, an audio device, a speech-to-text computing device, a speech recognition computing device, a virtual computing device, an augmented reality computing device, and any combination thereof.

3. The computer-implemented method of claim 2, wherein identifying comprises identifying a first location of at least one of: a graphical pointer and a scroll bar in the user interface.

4. The computer-implemented method of claim 3, further comprising:
   determining a second location of at least one of: the graphical pointer and the scroll bar; and
   scrolling, using the second scrolling operation, to the first location.

5. The computer-implemented method of claim 1, wherein detecting comprises detecting a plurality of first scrolling operations being performed within a predetermined period of time.

6. The computer-implemented method of claim 5, wherein selecting comprises selecting the second scrolling operation-to correspond to the plurality of first scrolling operations.

7. The computer-implemented method of claim 1, wherein the first view comprises a first element of the user interface, and wherein selecting comprises selecting one or more second scrolling operations to navigate to a second element of the user interface, the second element being located in at least one of the first view and the at least another view.

8. The computer-implemented method of claim 1, wherein the first scrolling operation comprises scrolling executed in a first direction, and the second scrolling operation comprises scrolling executed in a second direction, the first and second directions being different upon selection of the second scrolling operation.

9. The computer-implemented method of claim 1, wherein at least one of the first and second scrolling operations comprise at least one of: a scrolling operation in a horizontal direction, a scrolling operation in a vertical direction, a scrolling operation in a diagonal direction, a scrolling operation in one or more directions, and any combination thereof.

10. The computer-implemented method of claim 1, wherein the selecting comprises selecting the second scrolling operation based on an interval between a plurality of first scrolling operations.

11. The computer-implemented method of claim 1, wherein selecting comprises selecting a scrolling direction of the second scrolling operation based on a detected scrolling direction of the first scrolling operation.

12. A system comprising:
    at least one programmable processor; and
    a non-transitory machine-readable medium storing instructions that, when executed by the at least one programmable processor, cause the at least one programmable processor to perform operations comprising:
    detecting a first scrolling operation being performed in a first view of a user interface, the first scrolling operation being of a first type;
    identifying a content displayed in the first view of the user interface, the content being scrolled through using the first scrolling operation;
    determining that the first scrolling operation exceeded a predetermined scrolling threshold;
    selecting, based on the first scrolling operation, the content, and a determination that the first scrolling operation exceeded the predetermined scrolling threshold, a second scrolling operation for executing navigation between one or more of the first view of the user interface and at least another view of the user interface;
    executing the second scrolling operation of a second type;
    detecting a return to the content displayed in the first view of the user interface; and
    deactivating a scrolling element associated with the second scrolling operation of the second type in the first view of the user interface.

13. The system of claim 12, wherein at least one of the first and second scrolling operations are scrolling operations associated with one or more operations of the at least one of a computer mouse, a computer keyboard, a smartphone, a tablet computer, a laptop, a personal computer, a personal digital assistant, a touch screen, an audio device, a speech-to-text computing device, a speech recognition computing device, a virtual computing device, an augmented reality computing device, and any combination thereof.

14. The system of claim 13, wherein identifying comprises identifying a first location of at least one of: a graphical pointer and a scroll bar in the user interface, and wherein the operations further comprises:
    determining a second location of at least one of: the graphical pointer and the scroll bar; and
    scrolling, using the second scrolling operation, to the first location.

15. The system of claim 12, wherein detecting comprises detecting a plurality of first scrolling operations being performed within a predetermined period of time;

wherein selecting comprises selecting the second scrolling operation to correspond to the plurality of first scrolling operations.

16. The system of claim 12, wherein the first view comprises a first element of the user interface;
wherein selecting comprises selecting the second scrolling operation to navigate to a second element of the user interface, the second element being located in at least one of the first view and the at least another view.

17. The system of claim 12, wherein the first scrolling operation comprises scrolling executed in a first direction, and the second scrolling operation—comprises scrolling executed in a second direction, the first direction and second direction being different upon selection of the second scrolling operation.

18. The system of claim 12, wherein at least one of the first and second scrolling operations comprise at least one of: a scrolling operation in a horizontal direction, a scrolling operation in a vertical direction, a scrolling operation in a diagonal direction, a scrolling operation in one or more directions, and any combination thereof.

19. A computer program product comprising a non-transitory machine-readable medium storing instructions that, when executed by at least one programmable processor, cause the at least one programmable processor to perform operations comprising:
   detecting a first scrolling operation being performed in a first view of a user interface, the first scrolling operation being of a first type;
   identifying a content displayed in the first view of the user interface, the content being scrolled through using the first scrolling operation;
   determining that the first scrolling operation exceeded a predetermined scrolling threshold;
   selecting, based on the first scrolling operation, the content, and a determination that the first scrolling operation exceeded the predetermined scrolling threshold, a second scrolling operation for executing navigation between one or more of the first view of the user interface and at least another view of the user interface;
   executing the second scrolling operation of a second type;
   detecting a return to the content displayed in the first view of the user interface; and
   deactivating a scrolling element associated with the second scrolling operation of the second type in the first view of the user interface.

\* \* \* \* \*